Aug. 28, 1951
H. S. BROADWELL ET AL
2,565,839
VOLTAGE MEASURING DEVICE UTILIZING
PULSE TIME MODULATION
Filed March 11, 1949
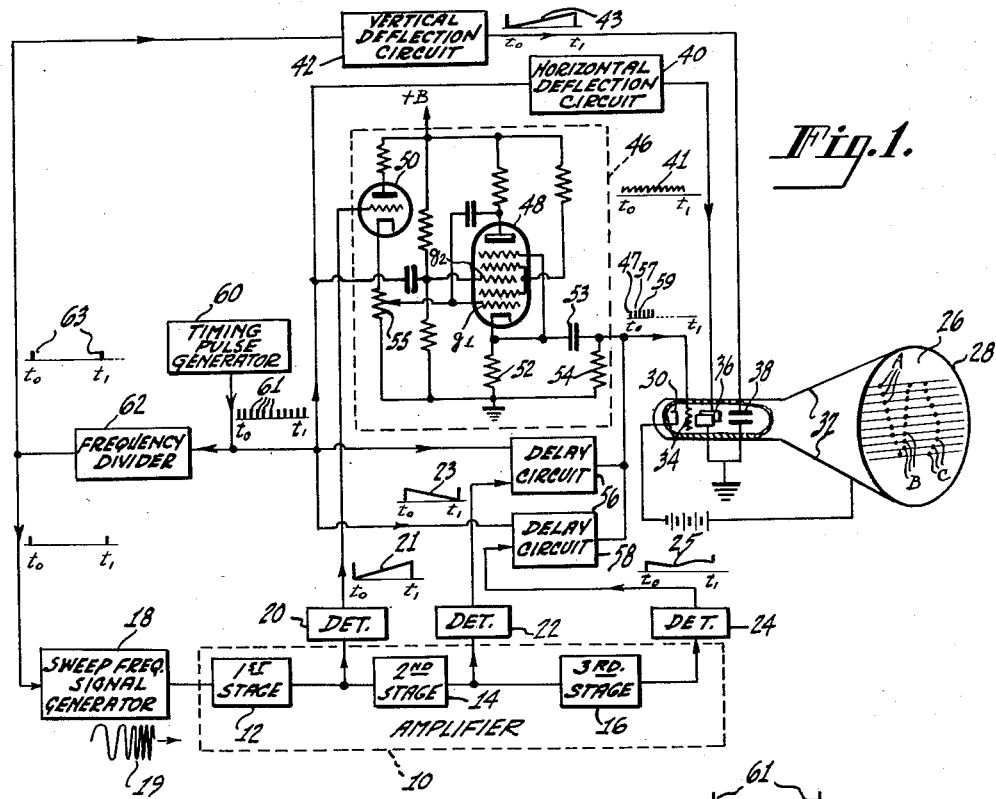
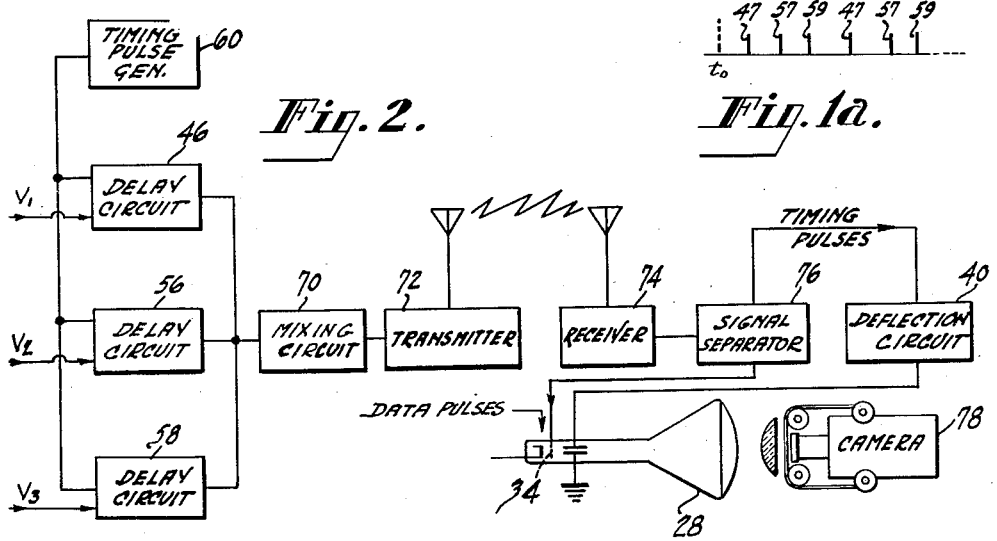
INVENTORS
HERBERT S. BROADWELL
& ROBERT H. PETERSON
ATTORNEY Patented Aug. 28, 1951

2,565,839

UNITED STATES PATENT OFFICE 2,565,839

VOLTAGE MEASURING DEVICE UTILIZING PULSE TIME MODULATION

Herbert S. Broadwell, Collingswood, and Robert H. Peterson, Camden, N. J., assignors to Radio Corporation of America, a corporation of Delaware Application March 11, 1949, Serial No. 80,848

5 Claims. (Cl. 179—171)

Our invention relates to improvements in apparatus for correlating electrical data, and while not limited thereto, finds particular application in electrical measuring systems.

In the electrical and mechanical arts, there are many instances in which it is expedient to make continuous measurements of a plurality of varying or variable conditions within a system or apparatus, and to have a concurrent display or a permanent record of data representing those conditions. Measurements of this kind are usually made in the operation of internal combustion engines, high power radio and television transmitters, and the like, and may also be relied on in carrying out test procedures with such apparatus.

In the case of simple data display or recording, it is, of course, common practice to provide a separate indicator or recorder for each of the quantities or conditions to be measured, such as the various indicators which may be seen on the conventional instrument panel of an airplane, for example. However, plural indicator systems for presenting the various data are not only inconvenient for the observer, but also become extremely complex and require considerable space where a large number of quantities are involved. Moreover, such systems are unsuitable for telemetering applications, because individual connections are required between the sending and receiving stations for each of the quantities to be handled, or an individual carrier frequency must be assigned to each quantity where the data are to be telemetered by radio.

As for the specific problem of concurrent indication of a plurality of voltages, it has been proposed previously to simplify the visual presentation of such electrical data by the use of cathode ray tubes. Prior art indicating systems using cathode ray tubes have represented an improvement over systems using a plurality of separate indicators or meters, but systems of this kind with which we are familiar have been inherently limited in flexibility. For example, one cathode ray tube indicator system which may be mentioned presents the various quantities as a series of vertical lines, each of which varies in length in response to variations in magnitude of the quantiy it represents. By means of a ganged switching arrangement, the vertical deflection voltage for the cathode ray tube is successively obtained from each of the voltage sources of interest, while the horizontal deflection voltage for the tube is increased in a series of discrete steps to provide lateral separation between each of the indications. While this system is adequate for a simple display of a plurality of slowly or intermittently varying voltages, it is not suitable for the observation of rapidly varying voltages, and it does not reduce the number of channels required in telemetering applications.

In brief, in the majority of prior art methods and systems for measuring and utilizing a plurality of varying or variable quantities, each of the quantities is handled separately throughout the particular operation involved. It is a general object of our present invention to overcome the limitations of such prior art devices by providing means for correlating varying or variable electrical data to facilitate the use of such data.

Another object of our invention is to provide improved means for continuously measuring and concurrently presenting a plurality of voltages in a visual display.

A further object of our invention is to provide improved means for combining electrical data into a composite signal suitable for visual presentation, recording, and/or telemetering.

According to our invention, the foregoing and other objects and advantages are attained by translating the voltages of interest into individual voltage pulse trains in a plurality of pulse-output time delay circuits. Where the term "pulse-output time delay circuit" is used herein and in the appended claims, it will be understood to refer to a circuit of the type in which a pulse of voltage is generated at a delayed time interval after the circuit has been triggered by a time-reference pulse of voltage. One such delay circuit is associated with each of the voltages to be correlated, and the pulse trains from all of the delay circuits are made available on a common output line.

All of the delay circuits are connected to a common source of time-reference pulses for simultaneous triggering of all of the delay circuits. The delay time of each delay circuit is made dependent on the magnitude of the quantity with which that circuit is associated, and the time at which each pulse from a given delay circuit will occur (with respect to a given time reference pulse) will correspond to the instantaneous magnitude of the quantity which each such pulse represents. Thus, the unknown quantities are all correlated in terms of time intervals taken with respect to common time-reference pulses, and, as will be brought out more fully hereinafter, the resulting composite pulse signal can be utilized in any one of several different ways. Any group of conditions, or elements of information, which are susceptible of reduction to, or expression as, electrical potentials may be correlated in this manner. For example, the various voltages may be obtained at different points of interest in an electric circuit, or they may be conditions, or elements of information, which can be translated into such voltages by suitable devices which vary the magnitude of an electrical output or signal in accordance with variations in the magnitude of a quantity being observed or measured.

A more complete understanding of the invention may be had by reference to the following description of illustrative embodiments thereof, when considered in connection with the accompanying drawing in which:

Fig. 1 illustrates voltage correlation and display apparatus arranged in accordance with our invention, Fig. 1a illustrates the form of pulses from the timing pulse generator and the delay circuits, and Fig. 2 shows a voltage correlation and telemetering-recording apparatus arranged in accordance with our invention.

A voltage correlation apparatus arranged in accordance with our invention is particularly adapted for use with a cathode ray indicator to obtain concurrent data display, and the invention will first be described in connection with such an apparatus. For the purpose of simple disclosure, a system for measuring and presenting concurrent indications of the frequency response at each of the stages of a conventional electrical amplifier has been chosen to illustrate our invention, although it will be obvious that the same general principles are equally applicable to other comparable measuring and indication problems.

Referring to Fig. 1, there is shown within the broken line block 10 an amplifier, such as might be used in a radio or television receiver, comprising three stages of amplification, 12, 14, and 16. In order to determine the frequency response of an amplifier (i. e. the relative output of the amplifier at each of a plurality of frequencies), it is common practice to supply a signal of varying frequency to the amplifier and to measure the total relative output of the amplifier at each of the applied frequencies. (See e. g. Terman-Radio Engineer's Handbook, 1943, p. 967.) In accordance with our invention, it is possible to obtain a concurrent display of the frequency response at each of the stages of the multi-stage amplifier 10, as well as an indication of the overall response of the amplifier.

A sweep frequency generator 18 is provided for supplying a signal of recurrently varying frequency to the amplifier 10. For example, the generator 18 may comprise a reactance-tube oscillator, modulated with a sawtooth voltage wave supplied to the reactance tube at a controlled rate. Signal detectors 20, 22 and 24 are provided at the output side of each of the amplifier stages 12, 14 and 16, respectively, to obtain D. C. voltages which will vary with time in accordance with the frequency response at each of the amplifier stages 12, 14, and 16. While it would be possible to observe the relative magnitude of the voltages from the detectors 20, 22, 24 on separate indicators, a graphical presentation thereof on a single indicator obviously is preferable, and is entirely feasible with the apparatus to be described.

A suitable indicator for the apparatus illustrated in Fig. 1 comprises a cathode ray tube 28, containing a cathode 30, an accelerating anode 32, an intensity control electrode 34, and beam deflecting means, such as pairs of horizontal and vertical electrostatic deflecting plates, 36 and 38, respectively. Horizontal and vertical deflection circuits, 40 and 42, respectively, are also provided, for controlling the deflection of the beam in the tube 28. The deflection circuits 40, 42 may comprise sawtooth voltage generators of conventional design, which will generate voltages varying linearly with time at harmonically related rates to produce a "raster" pattern (i. e. a pattern of closely spaced parallel lines) on the screen of the tube 28, similar to the deflection pattern commonly used in television systems. With such a deflection system, the beam will recurrently scan the screen 26 in a given direction at a given rate, while moving slowly in a direction normal to the recurrent scan, at a rate subharmonically related to the given scanning rate.

In order to permit concurrent display of the voltages from the detectors 20, 22, 24 on the screen 26 of the tube 28, each of the voltages from the detectors 20, 22, 24 are utilized to control the delay time of three pulse-output time delay circuits 46, 56, 58 which, in turn, supply beam-intensity control pulses to the control electrode 34 of the cathode ray tube 28. The delay circuits 46, 56, 58 may be of the so-called phantastron type, described in the publication "Principles of Radar," by the Members of the Staff of the Radar School at the Massachusetts Institute of Technology (second edition), pages 2–58 through 2–64, although other similar delay circuits, such as the so-called "start-stop" or "one-shot" multivibrator type, also described in the same publication at pages 2–50 through 2–58, are equally suitable.

A phantastron circuit has been shown in detail for the delay circuit 46, and is seen to include a pentagrid tube 48, together with a D. C. amplifier 50 which supplies one of the bias voltages for the tube 48. As set forth in the above-mentioned publication, a delayed pulse-reproducing action will be initiated in the phantastron delay circuit 46 by applying a positive pulse of voltage to a control grid $g_2$ of the tube 48 to initiate current flow in the tube 48. The duration of the delay interval will be a function of the bias voltage applied to another control grid $g_1$ of the tube 48. At the beginning and at the end of the current flow interval for the tube 48, abrupt changes in voltage will occur across a resistor 52 in the cathode circuit of the tube 48. These abrupt voltage changes will appear as pulses of voltage across an output resistor 54 due to the differentiating action of the resistor 54 and a coupling capacitor 53. For any one setting of a potentiometer 55 in the cathode circuit of the D. C. amplifier 50, the magnitude of the voltage at the grid $g_1$ of the tube 48 will be dependent on the voltage from the detector 20, so that the delay time of the delay circuit 46 will vary as a function of the output of the detector 20. Similarly, the delay times of the delay circuits 56 and 58 will be controlled by the instantaneous magnitudes of the voltages from the detectors 22 and 24, respectively. All of the delay circuits are connected to receive triggering pulses simultaneously from a timing pulse generator 60, which also serves to synchronize the action of the sweep frequency signal generator 18, the deflection circuits 40, 42, and the delay circuits 46, 56, 58, as will be described.

In order to produce a multi-line scan of the cathode ray beam, the vertical deflection circuit 42 must operate at a submultiple of the frequency of the horizontal deflection circuit 40, and accordingly, a frequency divider 62 is interposed between the timing generator 60 and the vertical deflection circuit 42. The reduced frequency pulses from the frequency divider 62 are also applied to the signal generator 18, in order that the frequency sweep of the generator 18 will be synchronized with the frame repetition (i. e. vertical deflection) of the cathode ray display.

The waveform and time relation of the signals at various points in the system of Figure 1 have been indicated in the drawing, and will be referred to in the following explanation of the operation of the system.

It can be assumed that the timing pulse generator 60 is supplying a train of pulses 61 to the delay circuits 46, 56, and 58 and to the frequency divider 62, as was previously mentioned. In order to simplify the drawing, a ten-line raster has been selected to illustrate the operation of the system, although it will be understood that the number of lines in the raster is not particularly critical, as long as sufficient definition is obtained in the resultant indication. Accordingly, in the apparatus shown, ten pulses of voltage 61 will occur between the time $t_0$ and $t_1$, where the time $t_0$ is regarded as the time of origin for one complete cycle of operation of the system, and the time $t_1$ is regarded as the beginning of the next succeeding cycle of operation. The output of the frequency divider 62 will comprise voltage pulses 63, one such pulse occurring for each group of ten pulses from the timing generator 60. The pulses 63 will control the recurrence rate of the sweep frequency signal generator 18, from which a varying-frequency signal 19 will be supplied to the amplifier 10. The pulses 63 will also control the recurrence rate of the sawtooth voltage 43 from the vertical deflection circuit 42. Each of the pulses 61 from the timing generator 60 will trigger all of the delay circuits 46, 56 and 58 simultaneously, and will also initiate one horizontal deflection of the cathode ray beam by triggering the horizontal deflection circuit 40.

It can be assumed that the delay circuit 46 is nominally adjusted (by the setting of the potentiometer 55) to supply an intensifying pulse of voltage 47 to the intensity control electrode 34 of the cathode ray tube 28 during the first one-third of each of the horizontal scans of the cathode ray beam; that the delay circuit 56 is nominally adjusted to generate a pulse 57 during the second one-third of each of the horizontal scans of the beam; and that the delay circuit 58 is nominally adjusted to provide an intensifying pulse 59 during the last one-third of each of the horizontal scans of the beam. Hence, each of the delay circuits 46, 56, 58 will generate time-delayed pulse trains having the same average recurrence rate.

In order to clarify the time relation between the pulses 61 from the timing pulse generator, and the pulses 47, 57, 59 from the delay circuits, a portion of one complete cycle of operation, beginning at the time $t_0$, has been shown in Fig. 1a on an expanded time scale. As illustrated in Fig. 1a, each of the delay circuits 46, 56, 58 will produce one output pulse 47, 57, 59 for each pulse 61 from the timing generator 60, and, hence, for each horizontal scan of the cathode ray beam.

During each succeeding horizontal scan of the beam, the frequency of the signal 19 from the generator 18 will be slightly greater than during the preceding scan, and accordingly, the D. C. voltage from each of the detectors 20, 22, 24 will vary as a function of the frequency response of the particular stage associated with any one detector. Similarly, the instantaneous recurrence rate for the pulses from any one delay circuit will vary in accordance with the instantaneous magnitude of the voltage from the detector connected thereto. For example, the voltage 21 from the detector 20 associated with the first stage 12 of the amplifier 10 has been shown as a voltage which increases at a substantially constant rate between the times $t_0$ and $t_1$ (as the frequency of the signal 19 from the generator 18 increases). The increasing voltage 21 from the detector 20 will increase the delay time for the delay circuit 46, so that, during each succeeding horizontal scan of the cathode ray beam, an intensifying pulse 47 will be supplied to the intensity control electrode 34 of the cathode ray tube 28 at a slightly later time after the beginning of the scan. Hence, a series of dots A will appear on the screen 26 of the tube, and the "line" traced by the dots A will be the frequency response curve for the first stage 12 of the amplifier. The intensifying pulses 57 and 59, from the delay circuits 56 and 58, respectively, will produce similar series of dots B and C on the screen 26 of the cathode ray tube, representing the frequency response of the amplifier 10 at the output of stages 14 and 16, respectively. It will be appreciated that the line of dots B will represent the cumulative response of the first two stages 12 and 14 of the amplifier 10, and that the series of dots C will represent the cumulative response of all three stages of the amplifier. In the usual case, this is considered preferable to a showing of the individual response of each stage, although if such individual showing is desired, the various stages of the amplifier could be decoupled from each other, and the signal from the generator 18 supplied individually to each stage. In the arrangement shown, it is apparent that the composite picture obtained on the screen of the cathode ray tube will be extremely helpful in aligning the various stages of the amplifier, since the over-all effect of the adjustments at any one stage can be viewed simultaneously with the effect at the particular stage involved. Thus, the apparatus which has been described provides a highly flexible arrangement for correlating several varying quantities and for presenting an indication of all of the quantities concurrently on the screen of a cathode ray tube.

It will be apparent that the principles of the invention, as thus far explained, are equally applicable to other analogous measuring and indicating problems where it is desired to handle a plurality of varying or variable quantities. Moreover, where a permanent printed record is required, pulses from the timing generator 60 and from the delay circuits 46, 56, 58 can be used to control the operation of a telephoto type facsimile recorder in a manner analogous to the use of the pulses with a cathode ray tube indicator.

As was previously mentioned, the principles of the invention are also adapted for use in telemetering applications. Accordingly, in Figure 2 there is shown a complete telemetering system arranged in accordance with the invention, including means for making a photographic record of the data being handled.

In the system of Figure 2, it is contemplated that voltages $V_1$, $V_2$, $V_3$, obtained at one location are to be transmitted to a distant point, at which point a photographic record is to be made of the data transmitted. Such a system is useful in testing aircraft for example, where there is a possibility that important information obtained during the tests will be lost if structural failures force the pilot to leave the aircraft in mid-air. Other similar situations are encountered in the use of weather-observation balloons, guided missiles, and the like.

Referring to Fig. 2, it will be seen that delay circuits 46, 56, 58 of the type referred to in connection with Fig. 1, are provided for each of the voltages $V_1$, $V_2$, $V_3$ of interest (sources not shown). As in the apparatus of Fig. 1, a timing pulse generator 60 is also included to synchronize the action of the three delay circuits 46, 56, 58, so that the voltages can be correlated as was previously described. To obtain a suitable signal for transmission purposes, the output pulses from the delay circuits are mixed with pulses from the timing pulse generator in a mixing circuit 70. After the signals from the timing pulse generator and the delay circuits have been combined in the mixing circuit, the composite signal therefrom is passed to a transmitter 72, wherein the composite signal is used to modulate a carrier wave that can be amplified and transmitted in the usual manner.

The signals from the transmitter 72 are picked up by a receiver 74, wherein the received signal is demodulated, and the modulation envelope, which corresponds to the composite pulse-signal output of the mixing circuit 70, is passed on to a signal separator 76, wherein the timing-pulse portions of the modulation envelope are separated from the delayed data pulses. From the signal separator 76, the timing pulses are applied to a deflection circuit 40 to control the repetition rate of the sawtooth voltage output thereof, while the delayed pulse trains which originated in the delay circuits 46, 56, 58 are applied directly to the control grid 34 of a cathode ray indicator tube 28, as shown. Since circuits of the type designated by the blocks 70—76 are common in television apparatus, a detailed showing or description thereof is felt to be unnecessary.

In the system of Fig. 2, it will be noted that only one deflection circuit 40 is needed for the cathode ray tube 28. In this system, a raster-type display on the fluorescent screen of the indicator is not necessary, the cathode ray beam being deflected repeatedly along the same path across the screen of the tube 28. During each deflection of the cathode ray beam, one pulse from each of the delay circuits is applied to the grid of the cathode ray tube through the signal separator 76 and other intermediate stages of the system. Accordingly, for the three-channel system shown, three "dots" will appear on the screen of the tube, and as the data voltage at the input of any one of the delay circuits 46, 56, 58 changes in magnitude, the position of the dot corresponding thereto on the cathode ray screen will change. If the data voltages are not changing rapidly in magnitude, it is possible to observe the position of each of the dots, and to follow positional changes thereof with the eye. However, a more reliable method of following changes in the data presented is to make a continuous picture of the cathode ray display on the film of a motion picture camera 78, with the camera being set up facing the cathode ray screen as shown. In this manner, a complete and accurate record can be obtained of the various voltages $V_1$, $V_2$, $V_3$ of interest.

While the illustrative systems described herein have been shown with only three delay circuits 46, 56, 58, it is obvious that a much larger number of delay circuits could be used if necessary. By correlating voltages in accordance with our invention, a relatively large number of quantities can be handled without complex equipment, and the problem of concurrent data display can be greatly simplified.

Since many changes could be made in the systems shown and described, all within the scope and spirit of the invention, the foregoing is to be construed as illustrative, and not in a limiting sense.

What we claim is:

1. In an apparatus for obtaining a concurrent indication of a plurality of voltages, in combination, a source of recurring time-reference pulses of given recurrence rate, means including pulse-output time delay circuits for converting pulses from said pulse source into unequally time-delayed trains of voltage pulses of average recurrence rates equal to said given rate and for varying the instantaneous recurrence rate of the pulses in each of said pulse trains in accordance with the instantaneous magnitude of one of said voltages, and indicating means responsive to the pulses in said pulse trains and to undelayed pulses from said source for producing an indication of the time relation between said pulses from said source and said pulses in said pulse trains.

2. In an apparatus for obtaining a concurrent indication of a plurality of voltages, in combination, a source of recurring time-reference pulses of given recurrence rate, a cathode ray indicator tube having an intensity control electrode, means for recurrently deflecting the cathode ray in said tube in a given direction at a given rate, and means including pulse-output time delay circuits for converting pulses from said pulse source into unequally time-delayed trains of voltage pulses of average recurrence rates equal to said given rate and for varying the instantaneous recurrence rate of the pulses in each of said pulse trains in accordance with the instantaneous magnitude of one of said voltages, said delay circuits being coupled to said control electrode to vary the intensity of said cathode ray on the occurrence of each pulse in said pulse trains.

3. In an apparatus for obtaining a concurrent indication of a plurality of voltages representing quantities to be measured, in combination, a source of recurring time-reference pulses of given recurrence rate, a cathode ray indicator tube having an intensity control electrode, means for producing a multiple parallel line deflection of the cathode ray in said tube, and means including pulse-output time delay circuits for converting pulses from said pulse source into unequally time-delayed trains of voltage pulses of average recurrence rates equal to said given rate and for varying the instantaneous recurrence rate of the pulses in each of said pulse trains in accordance with the instantaneous magnitude of one of said voltages, said delay circuits being coupled to said control electrode to vary the intensity of said cathode ray on the occurrence of each pulse in said pulse trains.

4. In an apparatus for obtaining a concurrent indication of the voltages from a plurality of voltage sources, in combination, a source of recurring time-reference pulses of given recurrence rate, a cathode ray indicator tube having an intensity control electrode, means for recurrently deflecting the cathode ray in said tube in a given direction at a given rate, and means including pulse-output time delay circuits coupled to said voltage sources for converting pulses from said pulse source into unequally time-delayed trains of voltage pulses of average recurrence rates equal to said given rate and for varying the instantaneous recurrence rate of the pulses in each of said pulse trains in accordance with the instantaneous magnitude of one of said voltages, said delay circuits being coupled to said control electrode to vary the intensity of said cathode ray on the occurrence of each pulse in said pulse trains.

5. In an apparatus for obtaining a concurrent indication of the frequency response of a multistage electrical amplifier at each of the stages of said amplifier, said apparatus comprising, in combination, a source of recurring time-reference voltage pulses of given recurrence rate, means coupled to said pulse source for producing recurring voltage waves representing the frequency response of said amplifier at each of said stages, a cathode ray indicator tube having an intensity control electrode, means coupled to said pulse source for recurrently deflecting the cathode ray in said tube in a given direction at a given rate, and means including pulse-output time delay circuits for converting pulses from said pulse source into unequally time-delayed trains of voltage pulses of average recurrence rates equal to said given rate and for varying the instantaneous recurrence rate of the pulses in each of said pulse trains in accordance with the instantaneous magnitude of one of said voltage waves, said delay circuits being coupled to said control electrode to vary the intensity of said cathode ray on the occurrence of each pulse in said pulse trains.

HERBERT S. BROADWELL.
ROBERT H. PETERSON.

REFERENCES CITED

The following references are of record in the file of this patent:

UNITED STATES PATENTS

| Number | Name | Date |
|---|---|---|
| 2,429,613 | Deloraine et al. | Oct. 28, 1947 |
| 2,447,233 | Chatterjea et al. | Aug. 17, 1948 |